United States Patent
Kim et al.

(10) Patent No.: US 8,877,118 B2
(45) Date of Patent: Nov. 4, 2014

(54) METHODS OF PRODUCING ANODES FOR SOLID OXIDE FUEL CELLS

(75) Inventors: Chang-Sam Kim, Seoul (KR); Kyoung Ran Han, Seoul (KR); Sang Whan Park, Seoul (KR); Sung Woon Jeon, Busan (KR)

(73) Assignee: Korea Institute of Science and Technology, Seoul (KR)

( * ) Notice: Subject to any disclaimer, the term of this patent is extended or adjusted under 35 U.S.C. 154(b) by 317 days.

(21) Appl. No.: 13/310,284

(22) Filed: Dec. 2, 2011

(65) Prior Publication Data

US 2013/0093128 A1    Apr. 18, 2013

(30) Foreign Application Priority Data

Oct. 17, 2011 (KR) .................. 10-2011-0105885

(51) Int. Cl.
| | |
|---|---|
| C04B 35/486 | (2006.01) |
| H01M 8/12 | (2006.01) |
| H01M 4/88 | (2006.01) |
| H01M 4/90 | (2006.01) |
| C04B 38/06 | (2006.01) |
| H01M 4/86 | (2006.01) |
| C04B 111/00 | (2006.01) |

(52) U.S. Cl.
CPC ........... *C04B 35/486* (2013.01); *H01M 8/1246* (2013.01); *H01M 4/8889* (2013.01); *C04B 2235/405* (2013.01); *H01M 4/9066* (2013.01); *C04B 38/0615* (2013.01); *H01M 8/1213* (2013.01); *Y02E 60/521* (2013.01); *C04B 2235/5454* (2013.01); *H01M 4/8652* (2013.01); *C04B 2235/80* (2013.01); *C04B 2235/9615* (2013.01); *C04B 2111/00853* (2013.01); *C04B 2235/3279* (2013.01); *Y02E 60/525* (2013.01); *C04B 2235/664* (2013.01); *C04B 2235/3246* (2013.01); *C04B 2235/5445* (2013.01); *H01M 4/8621* (2013.01)
USPC ......................................................... 264/618

(58) Field of Classification Search
CPC .................. C04B 35/486; C04B 2111/00853; C04B 2235/664; Y02E 60/525; H01M 4/8621; H01M 8/12
USPC ......................................................... 264/618
See application file for complete search history.

(56) References Cited

U.S. PATENT DOCUMENTS

| | | | | |
|---|---|---|---|---|
| 3,300,344 | A * | 1/1967 | Bray et al. | 429/480 |
| 7,186,368 | B2 * | 3/2007 | Simwonis et al. | 264/618 |
| 7,597,978 | B2 * | 10/2009 | Lee et al. | 429/459 |
| 2001/0008094 | A1 * | 7/2001 | Piro et al. | 75/230 |
| 2003/0178307 | A1 * | 9/2003 | Sarkar | 204/483 |
| 2006/0024547 | A1 * | 2/2006 | Waldbillig et al. | 429/33 |
| 2006/0269813 | A1 * | 11/2006 | Seabaugh et al. | 429/30 |
| 2007/0020508 | A1 * | 1/2007 | Lee et al. | 429/45 |
| 2007/0072035 | A1 * | 3/2007 | Korevaar et al. | 429/32 |
| 2009/0068373 | A1 * | 3/2009 | Lee et al. | 427/453 |
| 2009/0136812 | A1 * | 5/2009 | Yonesato et al. | 429/30 |
| 2010/0055533 | A1 * | 3/2010 | Kebbede et al. | 429/33 |
| 2011/0133119 | A1 * | 6/2011 | Domae et al. | 252/182.1 |
| 2011/0244365 | A1 * | 10/2011 | Ryu et al. | 429/489 |
| 2011/0262629 | A1 * | 10/2011 | Delahaye et al. | 427/115 |
| 2013/0143140 | A1 * | 6/2013 | Yoon et al. | 429/466 |
| 2013/0280638 | A1 * | 10/2013 | Levy et al. | 429/482 |

* cited by examiner

*Primary Examiner* — Jason L Lazorcik
*Assistant Examiner* — Russell Kemmerle, III
(74) *Attorney, Agent, or Firm* — Ladas & Parry LLP

(57) ABSTRACT

Disclosed are methods of producing Ni/YSZ porous anode bodies for solid oxide fuel cells. According to the methods, a small amount of a nickel compound or salt is used as a pore former. Upon heating in air, the nickel compound or salt is decomposed into nickel oxide and releases gases, resulting in volume shrinkage. Therefore, Ni/YSZ porous bodies having a uniform pore size and reduction products thereof can be produced in an economical manner.

15 Claims, No Drawings

METHODS OF PRODUCING ANODES FOR SOLID OXIDE FUEL CELLS

CROSS-REFERENCE TO RELATED APPLICATIONS

This application claims priority under 35 U.S.C. §119 to Korean Patent Application No. 10-2011-0105885 filed on Oct. 17, 2011, in the Korean Intellectual Property Office, the disclosure of which is incorporated herein by reference in its entirety.

BACKGROUND OF THE INVENTION

1. Field of the Invention

The present invention relates to methods of producing anodes for solid oxide fuel cells.

2. Description of the Related Art

Solid oxide fuel cells using oxygen-ion conductive solid oxides as electrolytes are operated at temperatures of 700° C. or higher. Due to this high-temperature operation, solid oxide fuel cells can exhibit the highest efficiency among other types of fuel cells. All elements of solid oxide fuel cells are made of solids. The structural characteristics make solid oxide fuel cells simpler in structure than any other fuel cell, do not cause problems of degradation or loss and corrosion of electrolytes, and enable direct supply of fuel through internal structure modification without using any noble metal catalysts. Another advantage of solid oxide fuel cells is that combined heat and power generation is possible using very hot exhaust gases. Due to these advantages, research aimed at commercialization of solid oxide fuel cells in the early 21st century is being actively undertaken in advanced countries, including U.S., Japan and Germany.

A general solid oxide fuel cell includes an oxygen ion-conducting dense electrolyte layer, a porous cathode and a porous anode. The two electrodes are positioned at both sides of the electrolyte layer. 8 mol % yttria ($Y_2O_3$)-stabilized zirconia ($ZrO_2$) (YSZ), $LaSrMnO_3$ (LSM) and Ni/YSZ are mainly used as materials for the electrolyte, the cathode and the anode, respectively.

The operational principle of the solid oxide fuel cell is as follows. Oxygen receives electrons and is reduced to oxygen ions at the porous cathode. The oxygen ions reach an electrolyte/cathode interface and migrate to the anode through the dense electrolyte layer. The oxygen ions react with hydrogen supplied from the porous anode to create water. When the anode where electrons are produced is connected to the cathode where electrons are consumed, a current of electricity flows through the two electrodes.

Reactions of the anode take place at the three-phase boundary (TPB) where fuel (for example, $H_2$), the Ni catalyst and the YSZ meet together. The performance of the fuel cell can be maximized by optimizing the relationship between an increase in gas diffusion through the anode and a drop in performance resulting from the replacement of the TPB with pores. The porosity of the Ni/YSZ anode produced without using any pore former reaches 23 to 27%, which varies depending on the amount of NiO mixed from 56 to 70% by weight. However, this porosity level is not sufficient for gas diffusion, leading to a drop in the performance of the fuel cell. Thus, a further increase in porosity is needed.

For maximum performance of the fuel cell, the anode is required to have a uniform fine structure and a uniform porous structure, which are advantageous for gas diffusion. A uniform fine structure of the anode is obtained using a homogeneous mixture of fine powders. However, in the case where the fine powders is smaller in size than 1 μm, micropores are formed upon sintering and the number of open pores is not sufficient, making it difficult for gases to diffuse through the anode. Thus, the addition of a suitable pore former is needed to form a sufficient number of open pores.

Carbon powders are usually used as pore formers. Other pore formers include organic materials, such as fine polymethyl methacrylate (PMMA) beads and starches. There is a study reporting that when a carbon powder was used in amounts ranging from 20 to 50% by volume, 30% by volume of the carbon powder provided a porosity of 35%, which is a preferable level. Like the study on the use of the carbon powder, some studies reported that the addition of a large amount of rice or corn starch produced a porosity of 30 to 40%.

According to a prior art method, an anode support is produced using a mixture of a carbon-based pore former (such as carbon black or a polymer), which is mentioned above, a matrix material (such as NiO/YSZ), a binder and one or more additives.

However, the use of the carbon-based pore former as a material for the production of the anode support is environmentally harmful. The carbon-based pore former is very susceptible to external factors, such as molding pressure, during subsequent molding. This susceptibility makes it difficult to control pores. Particularly, the carbon-based pore former is difficult to uniformly mix with the matrix material and tends to leave aggregates because it is not readily dispersed in water and has a very different density from the matrix material. Further, the carbon-based pore former emits heat when being oxidized, resulting in a local temperature rise. As a result, the anode support is likely to be highly defective and has a high shrinkage.

SUMMARY OF THE INVENTION

It is, therefore, an object of the present invention to provide a method of producing a porous body using a nickel salt as a pore former that can be readily dispersed even in an aqueous medium, by which the formation of non-uniform macropores or defects resulting from carbon aggregation can be prevented.

It is another object of the present invention to provide a method of producing a porous body using, as starting materials, a nickel compound as a matrix material and a zirconia raw material without using an organic pore former, by which material costs can be saved and $CO_2$ emission can be reduced.

According to an aspect of the present invention, there is provided a method of producing a Ni/zirconia-based porous body, the method including (a) mixing a zirconia raw material, nickel oxide, a thermally decomposable nickel salt and a binder, (b) forming the mixture into a green body, and heat treating the green body at a low temperature to remove decomposable materials from the green body. (c) sintering the heat-treated green body at a high temperature to obtain a sintered body, and (d) reducing the sintered body.

According to another aspect of the present invention, there is provided a method of producing a Ni/zirconia-based anode for a solid oxide fuel cell, the method including (a') mixing a zirconia raw material, nickel oxide, a thermally decomposable nickel salt and a binder, (b') forming the mixture into a green body having a shape selected from flat plates, flat tubes and tubes, and heat treating the green body at a low temperature to remove decomposable materials from the green body, (c') sintering the heat-treated green body at a high temperature to obtain a sintered body, and (d') reducing the sintered body.

According to yet another of the present invention, there is provided a method of producing an anode having a Ni/zirconia-based functional layer for a solid oxide fuel cell, the method including (a") mixing a zirconia raw material, nickel oxide, a thermally decomposable nickel salt and a binder, (b") forming the mixture into a green body having a shape selected from flat plates, flat tubes and tubes, and heat treating the green body at a low temperature to remove decomposable materials from the green body, (c") preliminarily sintering the heat-treated green body at a temperature of 900 to 1,200° C. to obtain a preliminarily sintered anode body, (d") applying the mixture to the preliminarily sintered anode body by a process selected from slip casting, tape casting and spray to cover a functional layer on the surface of the preliminarily sintered anode body, (e") sintering the preliminarily sintered anode body covered with the functional layer at a high temperature, and (f") reducing the sintered anode body covered with the sintered functional layer.

DETAILED DESCRIPTION OF THE INVENTION

The features and advantages of the present invention will become more apparent from the following detailed description.

According to an aspect of the present invention, there is provided a method of producing a Ni/zirconia-based porous body which includes (a) mixing a zirconia raw material, nickel oxide, a thermally decomposable nickel salt and a binder, (b) forming the mixture into a green body, and heat treating the green body at a low temperature to remove decomposable materials from the green body, (c) sintering the heat-treated green body at a high temperature to obtain a sintered body, and (d) reducing the sintered body.

In an embodiment, the mixing may be performed by a dry or wet process. A wet process is particularly preferred because the homogeneity of the mixture is increased and the formation of non-uniform macropores in the final porous body is prevented.

According to another aspect of the present invention, there is provided a method of producing a Ni/zirconia-based anode for a solid oxide fuel cell which includes (a') mixing a zirconia raw material, nickel oxide, a thermally decomposable nickel salt and a binder, (b') forming the mixture into a green body having a shape selected from flat plates, flat tubes and tubes, and heat treating the green body at a low temperature to remove decomposable materials from the green body, (c') sintering the heat-treated green body at a high temperature to obtain a sintered body, and (d') reducing the sintered body.

In an embodiment, the molding may be performed by a molding process, such as press molding, extrusion molding, injection molding, tape casting or slip casting.

According to yet another aspect of the present invention, there is provided a method of producing an anode for a solid oxide fuel cell in which a porous body produced according to several embodiments of the aspect of the present invention is formed as a functional layer on an anode support. Specifically, the method includes (a") mixing a zirconia raw material, nickel oxide, a thermally decomposable nickel salt and a binder, (b") forming the mixture into a green body having a shape selected from flat plates, flat tubes and tubes, and heat treating the green body at a low temperature to remove decomposable materials from the green body, (c") preliminarily sintering the heat-treated green body at a temperature of 900 to 1,200° C. to obtain a preliminarily sintered anode body, (d") applying the mixture to the preliminarily sintered anode body by a process selected from slip casting, tape casting and spray to cover a functional layer on the surface of the preliminarily sintered anode body, (e") sintering the preliminarily sintered anode body covered with the functional layer at a high temperature, and (f") reducing the sintered anode body covered with the sintered functional layer.

In embodiments of the aspects of the present invention, the zirconia raw materials may be zirconia stabilized or partially stabilized with yttria ($Y_2O_3$) or ceria ($CeO_2$) and the Ni/zirconia-based porous bodies may be Ni/YSZ porous bodies.

In further embodiments, the thermally decomposable nickel salts may be nickel salts that are decomposed into nickel oxide upon heating in air. Examples of such nickel salts include, but are not limited to, $Ni(OCOCH_3)_2$, $Ni(HCOO)_2$, $Ni(C_5H_7O_2)_2$, $NiCO_3.2Ni(OH)_2$, $2NiCO_3.3Ni(OH)_2$, $NiCl_2$, $Ni(OH)_2$, $Ni(NO_3)_2$, $[CH_3(CH_2)_6CO_2]_2Ni$, $NiC_2O_4$, $Ni(ClO_4)_2$, $NiSO_4$, and hydrates thereof. These nickel salts may be used alone or as a mixture of two or more thereof.

Examples of particularly preferred nickel salts include, but are not limited to, nickel acetate tetrahydrate ($Ni(OCOCH_3)_2.4H_2O$), nickel formate dihydrate ($Ni(HCOO)_2.2H_2O$), nickel acetylacetonate ($Ni(C_5H_7O_2)_2$), basic nickel carbonate hydrates ($NiCO_3.2Ni(OH)_2.xH_2O$ and $2NiCO_3.3Ni(OH)_2.4H_2O$)), nickel chloride ($NiCl_2$), nickel hydroxide ($Ni(OH)_2$), nickel nitrate hexahydrate ($Ni(NO_3)_2.6H_2O$), nickel octanoate x-hydrate ($[CH_3(CH_2)_6CO_2]_2Ni.xH_2O$), nickel oxalate dihydrate ($NiC_2O_4.2H_2O$), nickel perchlorate hexahydrate ($Ni(ClO_4)_2.6H_2O$), nickel sulfate hexahydrate ($NiSO_4.6H_2O$) and nickel sulfate heptahydrate ($NiSO_4.7H_2O$).

Particularly, the use of nickel formate is preferred because physical properties in terms of porosity and shrinkage can be most maximized, no harmful gases are produced, mixing homogeneity with the matrix material can be improved and aggregation can be prevented.

In another embodiment, the heat treatment temperature of the thermally decomposable nickel salt is from 200 to 700° C., preferably from 300 to 500° C., and the sintering temperature is as high as from 1,250 to 1,500° C., preferably from 1,300 to 1,450° C.

In another embodiment, the thermally decomposable nickel salt is used in an amount of 1 to 30% by weight, preferably 5 to 30% by weight, based on the amount of the nickel oxide used.

In an embodiment, the weight ratio of the stabilized zirconia to the nickel oxide is 20-40:80-60, preferably 25-35:75-65, and most preferably 30:70.

As described above, the nickel compound or salt as a NiO precursor replaces a portion of the necessary amount of NiO. By taking advantage of the fact that the nickel compound or salt is decomposed into NiO while at the same time forming pores, the porosity of the porous body can be effectively increased.

Particularly, nickel formate is decomposed into nickel oxide while releasing $CO_2$ and $H_2O$ at 300° C., as depicted in the following reaction:

$$Ni(HCOO)_2 \rightarrow NiO + CO_2\uparrow + H_2O\uparrow$$

These gases are volatilized, leaving pores. The pores remain unchanged even during sintering at a temperature of 1,400° C. Accordingly, nickel formate is effective in increasing the porosity of the porous body.

In view of the structure of a fuel cell in which layers are laminated in close contact, shrinkage is considered an important factor. For example, taking into account that YSZ as an electrolyte should have a dense structure and has a shrinkage of about 22% upon sintering at 1,400° C., it is preferred that the anode have a shrinkage similar to that of the electrolyte.

Since the nickel compound or salt as a pore former is decomposed into NiO, it can replenish the amount of NiO in a simple manner without affecting the characteristics of Ni. In contrast, since a Zr compound or salt as a pore former is decomposed into monoclinic $ZrO_2$, it may affect the ionic conductivity of ion-conducting YSZ (8 mol % $Y_2O_3$-stabilized $ZrO_2$, cubic phase).

The nickel compound or salt as a pore former can be used in a small amount to increase the porosity of the porous body, unlike organic pore formers. The porosity of the porous body is dependent on the kind of the nickel compound or salt used. In addition, the use of a small amount of the pore former gives little influence to the shrinkage of the porous body.

The pore former may also be a mixture of an acidic nickel salt and a basic nickel salt.

According to a preferred embodiment of the present invention, there is provided a method of producing a Ni/YSZ porous body using starting materials including nickel oxide as a matrix material, a zirconia powder, and a nickel compound or salt that is thermally decomposed into nickel oxide (NiO) in air.

The nickel salt may be one kind or a mixture of two or more kinds.

In an embodiment, the nickel compound may be in the form of a powder.

In an embodiment, the nickel compound may be in the form of a liquid.

The following examples are specifically provided to assist in a further understanding of the invention and are not to be construed as in any way limiting the scope and disclosure of the invention.

EXAMPLES

Example 1

This example was intended to replace 10 wt % of the necessary amount of NiO with a nickel nitrate salt that is decomposed into NiO by heat treatment to form pores, contributing to an increase in porosity. 15 g of an 8 mol % yttria-stabilized zirconia powder (8YSZ, average particle size: 30 nm, 30 wt %), a nickel oxide powder (average particle size: 0.3 μm, 31.5 g (63 wt %)) and 14.19 g of nickel nitrate hexahydrate ($Ni(NO_3)_2 \cdot 6H_2O$) (corresponding to 3.5 g of NiO) were placed in a polypropylene container and mixed with ethanol by milling with zirconia balls having a diameter of 5 mm for about 6 hr. To the mixture was added 1 wt % of PVB as a binder. The resulting mixture was milled for about one additional hour. The slurry was poured into a glass bowl and dried in an oven at 100° C. The obtained mixed powder was put into a metal mold (40 mm×5 mm) and uniaxially pressed at 75 MPa/cm² to produce a bar-like green body having a dimension of 40 mm×5 mm×4 mm. The green body was heat treated in air at varying heating rates and at 1,400° C. for 3 hr. The sintered NiO/YSZ body was reduced at 800° C. for 2 hr under a flow of a 6% mixed gas of $H_2/N_2$ to produce a Ni/YSZ porous body.

The length and the weight of the porous body were measured to calculate the shrinkage (21%) and porosity (34%) of the porous body. The voltage of the bar-like specimen was measured using a 4-point probe while heating at a rate of 5° C./min under a flow of a 6% mixed gas of $H_2/N_2$ to calculate the electrical conductivity of the porous body. The strength of the porous body was obtained by a 3-point bending test with an inner span of 20 mm. The shrinkage, porosity, electrical conductivity and 3-point bending strength of porous bodies produced in the following examples were measured by the same methods as described above. The results are shown in Table 1.

Example 2

A Ni/YSZ porous body was produced in the same manner as in Example 1, except that 6.48 g of basic nickel carbonate ($NiCO_3 \cdot 3Ni(OH)_2 \cdot 1H_2O$) (corresponding to 3.5 g of NiO) was used instead of nickel nitrate hexahydrate.

Example 3

A Ni/YSZ porous body was produced in the same manner as in Example 2, except that the basic nickel carbonate ($NiCO_3 \cdot 3Ni(OH)_2 \cdot H_2O$) was used in an amount corresponding to 20 wt % of the necessary amount of NiO instead of 6.48 g of the basic nickel carbonate (corresponding to 3.5 g of NiO) corresponding to 10 wt % of the necessary amount of NiO.

Example 4

A Ni/YSZ porous body was produced in the same manner as in Example 2, except that the amount of the basic nickel carbonate was changed from 10 wt % to 30 wt % of the necessary amount of NiO.

Example 5

In accordance with the method described in Example 1, a Ni/YSZ porous body was produced using 15 g of an 8 mol % yttria-stabilized zirconia powder (8YSZ, average particle size: 30 nm, 30 wt %), 31.5 g of a nickel oxide powder (average particle size: 0.3 μm, 63 wt %), 4.25 g of nickel nitrate hexahydrate ($Ni(NO_3)_2 \cdot 6H_2O$) (corresponding to 1.05 g of NiO) and 4.54 g of the basic nickel carbonate (corresponding to 2.45 g of NiO).

Example 6

In accordance with the method described in Example 1, a Ni/YSZ porous body was produced using 15 g of an 8 mol % yttria-stabilized zirconia powder (8YSZ, average particle size: 30 nm, 30 wt %), 31.5 g of a nickel oxide powder (average particle size: 0.3 μm, 63 wt %) and 8.66 g of nickel formate (corresponding to 3.5 g of NiO).

Example 7

A Ni/YSZ composite was produced in the same manner as in Example 1, except that 4.34 g of nickel hydroxide (corresponding to 3.5 g of NiO) was used instead of the nickel nitrate salt.

Example 8

A Ni/YSZ composite was produced in the same manner as in Example 1, except that a mixture of nickel formate and nickel hydroxide in a molar ratio of 3:7 was used instead of the nickel nitrate salt.

Comparative Example 1

In accordance with the method described in Example 1, a Ni/YSZ porous body was produced using 15 g of the 8YSZ powder and 35 g of the nickel oxide powder only.

TABLE 1

| | Shrinkage (%) | Porosity (%) | Electrical conductivity (S/cm at 800° C.) | 3-point bending strength (MPa) |
|---|---|---|---|---|
| Example 1 | 21 | 34 | 3,060 | 52 |
| Example 2 | 22 | 34 | 3,380 | 67 |
| Example 3 | 24 | 38 | 3,100 | 59 |
| Example 4 | 26 | 41 | 2,880 | 45 |
| Example 5 | 22 | 33 | 3,100 | 75 |
| Example 6 | 21.5 | 39 | 3,100 | 60 |
| Example 7 | 21 | 30 | 4,600 | 106 |
| Example 8 | 21.3 | 33 | 3,800 | 87 |
| Comparative Example 1 | 20 | 27 | 4,149 | 113 |

According to the present invention, anodes for solid oxide fuel cells including an anode support having a uniform fine structure and a functional layer can be produced. This construction can improve the migration and diffusion of gases through the anodes and can increase the efficiency of use of fuel and the efficiency of ion conduction, leading to a significant improvement in the performance of a fuel cell.

In addition, the use of the pore former of the same kind as the matrix material instead of environmentally harmful materials, such as carbon and polymers has the advantage of being environmentally friendly.

Furthermore, the heat treatment steps in the methods of the present invention can be carried out in a simpler manner than slow heating processes for burning carbon-based pore formers to form pores in the prior art.

Moreover, the fine structures of the sintered bodies obtained by the methods of the present invention advantageously facilitate the reduction of nickel oxide.

What is claimed is:

1. A method of producing a Ni/zirconia-based porous body, comprising
   (a) mixing a zirconia raw material, nickel oxide, a thermally decomposable nickel salt selected from $Ni(OCOCH_3)_2$, $Ni(HCOO)_2$, $Ni(C_5H_7O_2)_2$, $NiCl_2$, $[CH_3(CH_2)_6CO_2]_2Ni$, $NiC_2O_4$, $Ni(ClO_4)_2$, $NiSO_4$, hydrates thereof and mixtures of two or more thereof, and a binder,
   (b) forming the mixture into a green body, and heat treating the green body to remove decomposable materials from the green body,
   (c) sintering the heat-treated green body to obtain a sintered body, and
   (d) reducing the sintered body.

2. The method according to claim 1, wherein the zirconia raw material is zirconia stabilized or partially stabilized with yttria ($Y_2O_3$).

3. The method according to claim 1, wherein the heat treatment is performed at a temperature of 200 to 700° C., the sintering is performed at a temperature of 1,250 to 1,500° C., and the thermally decomposable nickel salt is used in an amount of 1 to 30% by weight, based on the amount of the nickel oxide used.

4. The method according to claim 1, wherein the zirconia raw material is scandium-doped zirconia.

5. A method of producing a Ni/zirconia-based anode for a solid oxide fuel cell, the method comprising
   (a') mixing a zirconia raw material that comprises zirconia stabilized or partially stabilized with yttria ($Y_2O_3$), nickel oxide, a thermally decomposable nickel salt and a binder, the thermally decomposable nickel salt selected from $Ni(OCOCH_3)_2$, $Ni(HCOO)_2$, $Ni(C_5H_7O_2)_2$, $NiCl_2$, $[CH_3(CH_2)_6CO_2]_2Ni$, $NiC_2O_4$, $Ni(ClO_4)_2$, $NiSO_4$, hydrates thereof and mixtures of two or more thereof,
   (b') forming the mixture into a green body having a shape selected from flat plates, flat tubes and tubes, and heat treating the green body to remove decomposable materials from the green body,
   (c') sintering the heat-treated green body to obtain a sintered anode body, and
   (d') reducing the sintered anode body.

6. The method according to claim 5, wherein the heat treatment is performed at a temperature of 200 to 700° C., the sintering is performed at a temperature of 1,250 to 1,500° C., and the thermally decomposable nickel salt is used in an amount of 1 to 30% by weight, based on the amount of the nickel oxide used.

7. A method of producing an anode having a Ni/zirconia-based functional layer for a solid oxide fuel cell, the method comprising
   (a") mixing a zirconia raw material, nickel oxide, a thermally decomposable nickel salt selected from $Ni(OCOCH_3)_2$, $Ni(HCOO)_2$, $Ni(C_5H_7O_2)_2$, $NiCl_2$, $[CH_3(CH_2)_6CO_2]_2Ni$, $NiC_2O_4$, $Ni(ClO_4)_2$, $NiSO_4$, hydrates thereof and mixtures of two or more thereof, and a binder,
   (b") forming the mixture into a green body having a shape selected from flat plates, flat tubes and tubes, and heat treating the green body to remove decomposable materials from the green body,
   (c") preliminarily sintering the heat-treated green body to obtain a preliminarily sintered anode body,
   (d") applying the mixture to the preliminarily sintered anode body by a process selected from slip casting, tape casting and spray to produce a functional layer on the surface of the preliminarily sintered anode body,
   (e") sintering the preliminarily sintered anode body coated with the functional layer, and
   (f") reducing the sintered anode body coated with the sintered functional layer.

8. The method according to claim 7, wherein the zirconia raw material is zirconia stabilized or partially stabilized with yttria ($Y_2O_3$) and the Ni/zirconia-based functional layer is a porous body.

9. The method according to claim 7, wherein the heat treatment is performed at a temperature of 200 to 700° C., the preliminary sintering is performed at a temperature of 900 to 1,200° C., the high-temperature sintering is performed at a temperature of 1,250 to 1,500° C., and the thermally decomposable nickel salt is used in an amount of 1 to 30% by weight, based on the amount of the nickel oxide used.

10. The method according to claim 7, wherein the zirconia raw material is scandium-doped zirconia.

11. A method of manufacturing a solid oxide fuel cell, the method comprising
   (A) mixing a zirconia raw material that comprises zirconia stabilized or partially stabilized with yttria ($Y_2O_3$), nickel oxide, a thermally decomposable nickel salt and a binder, wherein the thermally decomposable nickel salt is selected from the group consisting of $Ni(OCOCH_3)_2$, $Ni(HCOO)_2$, $Ni(C_5H_7O_2)_2$, $NiCl_2$, $[CH_3(CH_2)_6CO_2]_2Ni$, $NiC_2O_4$, $Ni(ClO_4)_2$, $NiSO_4$, hydrates thereof and mixtures of two or more thereof,
   (B) forming the mixture into a green body having a shape selected from flat plates, flat tubes and tubes, and heat treating the green body to remove decomposable materials from the green body, (C) sintering the heat-treated green body to obtain a sintered anode body, (D) coating an electrolyte on the sintered anode, followed by sintering to form an electrolyte layer on the anode, (E) coating a cathode on the electrolyte layer, followed by heat treatment, and (F) reducing the anode, the electrolyte layer and the cathode.

12. The method according to claim 11, wherein the zirconia raw material is scandium-doped zirconia.

13. A method of manufacturing a solid oxide fuel cell, the method comprising (A) mixing a zirconia raw material, nickel oxide, a thermally decomposable nickel salt selected from $Ni(OCOCH_3)_2$, $Ni(HCOO)_2$, $Ni(C_5H_7O_2)_2$, $NiCl_2$, $[CH_3(CH_2)_6CO_2]_2Ni$, $NiC_2O_4$, $Ni(ClO_4)_2$, $NiSO_4$, hydrates thereof and mixtures of two or more thereof, and a binder, (B) forming the mixture into a green body having a shape selected from flat plates, flat tubes and tubes, and primarily heat treating the green body to remove decomposable materials from the green body, (C) preliminarily sintering the primarily heat-treated green body to obtain a preliminarily sintered anode body, (C') applying the mixture to the preliminarily sintered anode body by a process selected from slip casting, tape casting and spray to produce a functional layer on the surface of the preliminarily sintered anode, (C") secondary sintering the anode coated with the functional layer, (D') coating an electrolyte on the functional layer coated on the anode, followed by the secondary sintering to form an electrolyte layer on the functional layer, (E') coating a cathode on the electrolyte layer, followed by secondary heat treatment, and (F) reducing the anode, the functional layer, the electrolyte layer and the cathode.

14. The method according to claim 11 or 13, wherein the primary heat treatment is performed at a temperature of 200 to 700° C., the preliminary sintering is performed at a temperature of 900 to 1,200° C., the secondary sintering is performed at a temperature of 1,350 to 1,500° C., the secondary heat treatment is performed at a temperature of 800 to 1,100° C., the reduction is performed at a temperature of 800 to 1,000° C., and the thermally decomposable nickel salt is used in an amount of 1 to 30% by weight based on the amount of the nickel oxide used.

15. The method according to claim 13, wherein the zirconia raw material is scandium-doped zirconia.

* * * * *